(12) United States Patent
Kozak et al.

(10) Patent No.: US 8,518,156 B2
(45) Date of Patent: Aug. 27, 2013

(54) METHOD AND SYSTEM FOR REGENERATING A SOLUTION USED IN A WASH VESSEL

(75) Inventors: Frederic Z. Kozak, Knoxville, TN (US);
Arlyn V. Petig, Kingsport, TN (US);
Ritesh Agarwal, Tampa, FL (US);
Rameshwar S. Hiwale, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 12/849,085

(22) Filed: Aug. 3, 2010

(65) Prior Publication Data
US 2011/0067567 A1    Mar. 24, 2011

Related U.S. Application Data

(60) Provisional application No. 61/244,191, filed on Sep. 21, 2009.

(51) Int. Cl.
*B01D 53/14* (2006.01)
(52) U.S. Cl.
USPC .......... 95/166; 95/264; 95/266; 95/156; 95/159; 95/162; 95/160; 95/163; 95/172; 95/187; 95/168; 95/183; 95/191; 95/193; 95/199; 95/207; 95/209; 95/232; 95/236

(58) Field of Classification Search
None
See application file for complete search history.

(56) References Cited

U.S. PATENT DOCUMENTS

| | | | |
|---|---|---|---|
| 2,043,109 A | | 6/1936 | McKee et al. |
| 2,106,734 A | * | 2/1938 | Gollmar ........................ 423/234 |
| 2,487,576 A | | 11/1949 | Meyers |
| 2,608,461 A | | 8/1952 | Frazier |
| 2,878,099 A | | 3/1959 | Breuing et al. |
| 3,255,233 A | | 6/1966 | Kunze et al. |
| 3,923,955 A | | 12/1975 | Fattinger |
| 4,009,243 A | * | 2/1977 | Weber et al. .................. 423/234 |
| 4,515,760 A | | 5/1985 | Lang et al. |
| 4,847,057 A | | 7/1989 | Brugerolle et al. |

(Continued)

FOREIGN PATENT DOCUMENTS

| | | |
|---|---|---|
| AU | 648129 | 7/1992 |
| AU | 678622 | 6/1995 |

(Continued)

OTHER PUBLICATIONS

Citing the definition of "aqueous" as found in Merriam-Webster Dictionary online. www.merriam-webster.com/dictionary/propeller (Jan. 5, 2012).*

(Continued)

*Primary Examiner* — Duane Smith
*Assistant Examiner* — Pankti Patel
(74) *Attorney, Agent, or Firm* — Robert D. Crawford

(57) ABSTRACT

A process and system (100) for removing contaminants from a solution to regenerate the solution within the system. The process includes providing a solution (165) from a wash vessel (160) to a stripping column (181), the solution (165) including contaminants removed from a flue gas stream (150) present in the wash vessel (160) and contacting the solution with steam (185) inside the stripping column (181) thereby removing the contaminants from the solution and regenerating the solution. The stripping column (181) is operated at a pressure less than about 700 kilopascal.

9 Claims, 3 Drawing Sheets

(56) References Cited

U.S. PATENT DOCUMENTS

| | | | |
|---|---|---|---|
| 4,977,745 | A | 12/1990 | Heichberger |
| 4,999,031 | A | 3/1991 | Gerhardt et al. |
| 5,067,972 | A | 11/1991 | Hemmings et al. |
| 5,137,550 | A | 8/1992 | Hegarty et al. |
| 5,186,916 | A | 2/1993 | Nevels |
| 5,318,758 | A | 6/1994 | Fujii |
| 5,378,442 | A | 1/1995 | Fujii et al. |
| 5,427,759 | A | 6/1995 | Heitmann |
| 5,453,115 | A | 9/1995 | Vuletic |
| 5,462,583 | A | 10/1995 | Wood et al. |
| 5,599,508 | A | 2/1997 | Martinelli et al. |
| 5,648,053 | A | 7/1997 | Mimura et al. |
| 5,700,311 | A | 12/1997 | Spencer |
| 5,756,058 | A | 5/1998 | Watanabe et al. |
| 5,832,712 | A | 11/1998 | Rønning et al. |
| 5,853,680 | A | 12/1998 | Iijima et al. |
| 5,979,180 | A | 11/1999 | Lebas et al. |
| 6,027,552 | A | 2/2000 | Ruck et al. |
| 6,210,467 | B1 | 4/2001 | Howard |
| 6,348,088 | B2 | 2/2002 | Chung |
| 6,372,023 | B1 | 4/2002 | Kiyono et al. |
| 6,458,188 | B1 | 10/2002 | Mace |
| 6,485,547 | B1 | 11/2002 | Iijima |
| 6,497,852 | B2 | 12/2002 | Chakravarti et al. |
| 6,506,350 | B2 | 1/2003 | Cooper et al. |
| 6,759,022 | B2 | 7/2004 | Hammer et al. |
| 6,764,530 | B2 | 7/2004 | Iijima |
| 7,022,296 | B1 | 4/2006 | Khang et al. |
| 7,083,662 | B2 | 8/2006 | Xu et al. |
| 7,128,777 | B2 | 10/2006 | Spencer |
| 7,160,456 | B2 | 1/2007 | Järventie |
| 7,255,842 | B1 * | 8/2007 | Yeh et al. ............... 423/234 |
| 2003/0140786 | A1 | 7/2003 | Iijima |
| 2004/0123736 | A1 | 7/2004 | Torres, Jr. et al. |
| 2004/0126294 | A1 | 7/2004 | Cooper et al. |
| 2005/0169825 | A1 | 8/2005 | Cadours et al. |
| 2006/0032377 | A1 * | 2/2006 | Reddy et al. ............... 96/234 |
| 2006/0178259 | A1 | 8/2006 | Schubert et al. |
| 2006/0204425 | A1 | 9/2006 | Kamijo et al. |
| 2007/0006565 | A1 | 1/2007 | Fleischer et al. |
| 2008/0072762 | A1 * | 3/2008 | Gal ............... 96/242 |
| 2008/0178733 | A1 | 7/2008 | Gal |
| 2008/0276803 | A1 * | 11/2008 | Molaison et al. ............... 95/178 |
| 2008/0307968 | A1 * | 12/2008 | Kang et al. ............... 95/199 |
| 2009/0101012 | A1 | 4/2009 | Gal et al. |
| 2009/0155889 | A1 | 6/2009 | Handagama et al. |
| 2010/0107875 | A1 * | 5/2010 | Koss et al. ............... 95/223 |
| 2010/0229723 | A1 * | 9/2010 | Gelowitz et al. ............... 95/162 |
| 2010/0319542 | A1 * | 12/2010 | Alix et al. ............... 95/223 |
| 2011/0052453 | A1 * | 3/2011 | McLarnon et al. ........... 422/170 |

FOREIGN PATENT DOCUMENTS

| | | |
|---|---|---|
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| DE | 469840 | 12/1928 |
| DE | 2832493 | 7/1978 |
| DE | 3633690 | 4/1988 |
| DE | 10 2005 033837 | 1/2007 |
| EP | 0243778 | 11/1987 |
| EP | 0502596 | 9/1992 |
| EP | 0588178 | 3/1994 |
| EP | 1759756 | 3/2007 |
| GB | 271852 | 5/1926 |
| GB | 871207 | 6/1961 |
| GB | 899611 | 6/1962 |
| GB | 2331526 | 5/1999 |
| KR | 100703999 B1 | 3/2007 |
| SU | 512785 | 5/1976 |
| SU | 1567251 | 5/1990 |
| WO | 98/47604 | 10/1998 |
| WO | 02/089958 | 11/2002 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | 2008/094777 | 8/2008 |
| WO | 2008/101293 | 8/2008 |
| WO | 2008/144918 | 12/2008 |
| WO | 2010/053683 | 5/2010 |

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of CO2, SO2 and NOx," Int. J. Environmental Tech. And Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliinary Results" International Journal of Thermodynamics, International Centre for Applied Thermodynamics, Istanbul, TR, vol. 7, No. 4, Dec. 1, 2004, pp. 173-181.

PCT International Search Report and The Written Opinion of the International Searching Authority, dated Dec. 29, 2010 (PCT/US2010/048853).

* cited by examiner

METHOD AND SYSTEM FOR REGENERATING A SOLUTION USED IN A WASH VESSEL

CROSS REFERENCE TO RELATED APPLICATIONS

This application claims priority to U.S. Provisional Patent Application No. 61/244,191, entitled "Method and System for Regenerating a Solution Used in a Wash Vessel" filed on Sep. 21, 2009, the entirety of which is incorporated by reference herein.

FIELD

The disclosed subject matter relates to a system and method for removing carbon dioxide ($CO_2$) and ammonia ($NH_3$) from a flue gas stream. More specifically, the disclosed subject matter relates to a system and method employing a stripping column for regenerating a solution utilized in removing ammonia from the flue gas stream.

BACKGROUND

Most of the energy used in the world is derived from the combustion of carbon and hydrogen-containing fuels such as coal, oil and natural gas. In addition to carbon and hydrogen, these fuels contain oxygen, moisture and contaminants such as ash, sulfur (often in the form of sulfur oxides, referred to as "SOx"), nitrogen compounds (often in the form of nitrogen oxides, referred to as "NOx"), chlorine, mercury, and other trace elements. Awareness regarding the damaging effects of the contaminants released during combustion triggers the enforcement of ever more stringent limits on emissions from power plants, refineries and other industrial processes. There is an increased pressure on operators of such plants to achieve near zero emission of contaminants.

Numerous processes and systems have been developed in response to the desire to achieve near zero emission of contaminants. Systems and processes include, but are not limited to desulfurization systems (known as wet flue gas desulfurization "WFGD" and dry flue gas desulfurization "DFGD"), particulate filters (including, for example, bag houses, particulate collectors, and the like), as well as the use of one or more sorbents that absorb contaminants from the flue gas. Examples of sorbents include, but are not limited to, activated carbon, ammonia, limestone, and the like.

It has been shown that ammonia efficiently removes $CO_2$, as well as other contaminants, such as sulfur dioxide ($SO_2$) and hydrogen chloride (HCl), from a flue gas stream. In one particular application, absorption and removal of $CO_2$ from a flue gas stream with ammonia is conducted at a low temperature, for example, between 0 and 20 degrees Celsius (0°-20° C.). To safeguard the efficiency of the system, and to comply with emission standards, maintenance of the ammonia within the flue gas stream treatment system is desired.

SUMMARY

According to aspects illustrated herein, there is provided a process for removing contaminants from a solution to regenerate the solution, the process comprising: providing a solution from a wash vessel to a stripping column, the solution including contaminants removed from a flue gas stream present in the wash vessel; and contacting the solution with steam inside the stripping column, thereby removing the contaminants from the solution and regenerating the solution, wherein the stripping column is operated at a pressure less than 700 kilopascal.

According to other aspects illustrated herein, there is provided a process for removing ammonia from an ammonia-removing solution, the process comprising: contacting an ammonia-removing solution with an ammonia-containing flue gas stream, thereby forming an ammonia-containing solution; providing the ammonia-containing solution to a stripping column; and contacting the ammonia-containing solution with steam in the stripping column, thereby removing ammonia from the ammonia-containing solution, wherein the stripping column is operated at a pressure less than 700 kilopascal.

According to other aspects illustrated herein, there is provided a system for removing ammonia from a solution, the system comprising: a wash vessel configured to receive an ammonia-containing flue gas stream and an ammonia-removing solution, the ammonia-containing flue gas stream contacted with an ammonia-removing solution in the wash vessel to form an ammonia-containing solution and a reduced-ammonia containing flue gas stream; and a stripping column configured to receive the ammonia-containing solution from the wash vessel, the ammonia-containing solution contacting steam in the stripping column to remove ammonia from the ammonia-containing solution, wherein the stripping column is operated at a pressure less than 700 kilopascal.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
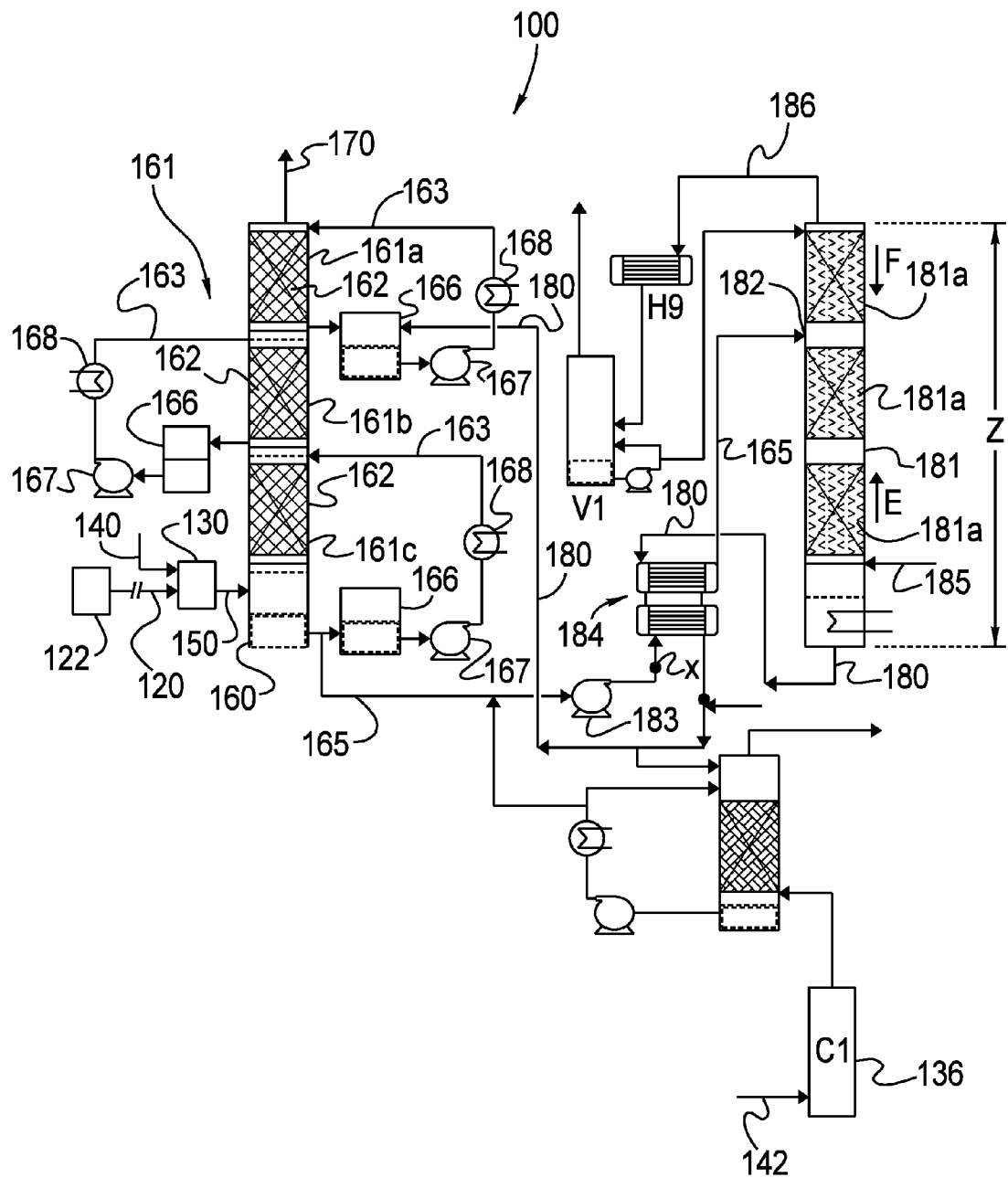
FIG. 1 is a schematic representation of a system used to reduce an amount of $CO_2$ and ammonia present in a flue gas stream.

In one embodiment, as shown in FIG. 1, a system 100 for removing contaminants, such as ammonia, carbon dioxide ($CO_2$), and combinations thereof, from a solution includes several devices and processes. The devices and processes employed in system 100 facilitate the removal of a variety of contaminants from a flue gas stream 120, which is generated by combustion of a fuel in a power plant 122.

Flue gas stream 120 is generated by combustion of a fuel in the power plant 122. Flue gas stream 120 may include numerous contaminants, including, but not limited to sulfur oxides (SOx), nitrogen oxides (NOx), as well as mercury, hydrochloride (HCl), particulate matter such as fly ash, $CO_2$, and the like. While not shown in FIG. 1, flue gas stream 120 may undergo treatment to remove contaminants therefrom, such as, for example, treatment by a flue gas desulfurization process and particulate collector, which may remove SOx and particulates from the flue gas.

Still referring to FIG. 1, flue gas stream 120 may also undergo treatment to remove $CO_2$ therefrom by passing the flue gas stream 120 through an absorbing system 130. While not shown in FIG. 1, it is contemplated that flue gas stream 120 may proceed through a cooling system prior to entering the absorbing system 130. The cooling system may cool the flue gas stream 120 to a temperature below ambient temperature.

Figure 2:
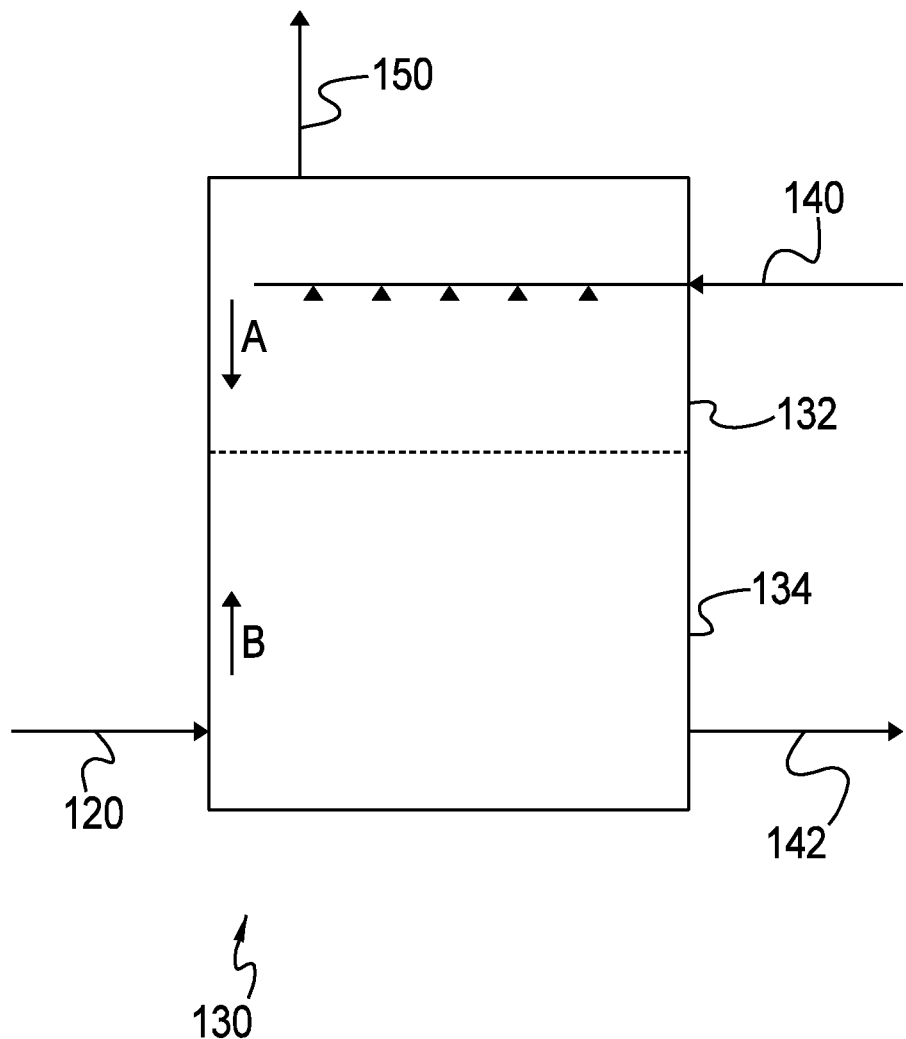
FIG. 2 is an illustration of one embodiment of an absorbing system utilized in the system depicted in FIG. 1.

Now referring to FIG. 2, wherein the absorbing system 130 is illustrated in more detail, the absorbing system facilitates the absorption of $CO_2$ from the flue gas stream 120 by contacting the flue gas stream with an ammoniated solution or slurry 140. In one embodiment, the ammoniated solution or slurry 140 may include dissolved ammonia and $CO_2$ species in a water solution. In another embodiment, the ammoniated solution or slurry 140 may include precipitated solids of ammonium bicarbonate in addition to the dissolved ammonia, $CO_2$ species, and water.

In one embodiment, absorbing system 130 includes a first absorber 132 and a second absorber 134. However, it is contemplated that absorbing system 130 may include more or less absorbers as illustrated in FIG. 2.

As shown in more detail in FIG. 2, ammoniated slurry or solution 140 is introduced to absorbing system 130, e.g., in first absorber 132 or second absorber 134, in a direction A that is countercurrent to a flow of flue gas stream 120 in direction B in the absorbing system 130. As the ammoniated slurry or solution 140 contacts flue gas stream 120, $CO_2$ present in the flue gas stream is absorbed and removed therefrom, thereby forming a $CO_2$-rich stream 142 and an ammonia-containing flue gas stream 150 exiting the absorbing system 130. At least a portion of the resulting $CO_2$-rich stream 142 is transported from the absorbing system 130 to a regeneration tower 136 (FIG. 1), where the $CO_2$-rich stream 142 may be regenerated to form the ammoniated slurry or solution 140 that is introduced to the absorbing system 130.

As noted above, the ammoniated slurry or solution 140 may be provided to the absorbing system 130 by recycling the used ammoniated slurry or solution from the bottom of the absorbing system, e.g., the $CO_2$-rich stream 142. In another embodiment, and as discussed in more detail below, the ammoniated slurry or solution 140 may be provided to the absorbing system 130 by utilizing ammonia removed from an ammonia-containing flue gas stream within the system 100.

Still referring to FIG. 2, in one embodiment, the absorbing system 130 operates at a low temperature, particularly at a temperature less than about twenty degrees Celsius (20° C.). In another embodiment, the absorbing system 130 operates at a temperature range of between about zero degrees Celsius to about twenty degrees Celsius (0° to 20° C.). In a further embodiment, the absorbing system 130 operates at a temperature range between about zero degrees Celsius to about ten degrees Celsius (0° to 10° C.). However, the system is not limited in this regard, since it is contemplated that the absorbing system 130 may be operated at any temperature desired or required by the user and/or application in which it is employed.

As shown in FIG. 1, the ammonia-containing flue gas stream 150 leaving the absorbing system 130 is introduced to a wash vessel 160. The system 100 is not limited in this regard since it is contemplated that wash vessel 160 may be used in conjunction with other systems and methods that generate a flue gas stream containing ammonia, i.e., the wash vessel may be used in a system that does not contain absorbing system 130.

In one embodiment, wash vessel 160 reduces an amount of ammonia and other contaminants present in the ammonia-containing flue gas stream 150 and forms a reduced ammonia-containing flue gas stream 170. The reduced ammonia-containing flue gas stream 170 may be released to the environment. While the reduced ammonia-containing flue gas stream 170 may be directly released to the environment from wash vessel 160, it is contemplated that the reduced ammonia-containing flue gas stream 170 may be further processed prior to being emitted to the environment, for example, it may be cooled by a direct contact cooler, or washed in an acidic solution to further reduce contaminant content.

Additionally, and while not shown in FIG. 1, it is contemplated that the amount or concentration of ammonia present in the reduced ammonia-containing flue gas stream 170 may be measured before the reduced ammonia-containing flue gas stream exits the wash vessel 160. In another embodiment, the amount or concentration of ammonia present in the reduced ammonia-containing flue gas stream 170 may be measured after the reduced ammonia-containing flue gas stream exits the wash vessel 160. Measurement of the amount of ammonia present in the reduced ammonia-containing flue gas stream 170 allows a user to monitor the amount of ammonia in the reduced ammonia-containing flue gas stream 170 either prior to, or just after, its release to the environment.

In one embodiment, wash vessel 160 is configured to accept ammonia-containing flue gas stream 150 with an opening 152 at the bottom of the wash vessel. While the opening 152 is shown at the bottom of the wash vessel 160, it is contemplated that the opening may be at any location in the wash vessel and the location may vary from system to system depending on the application.

Figure 3:
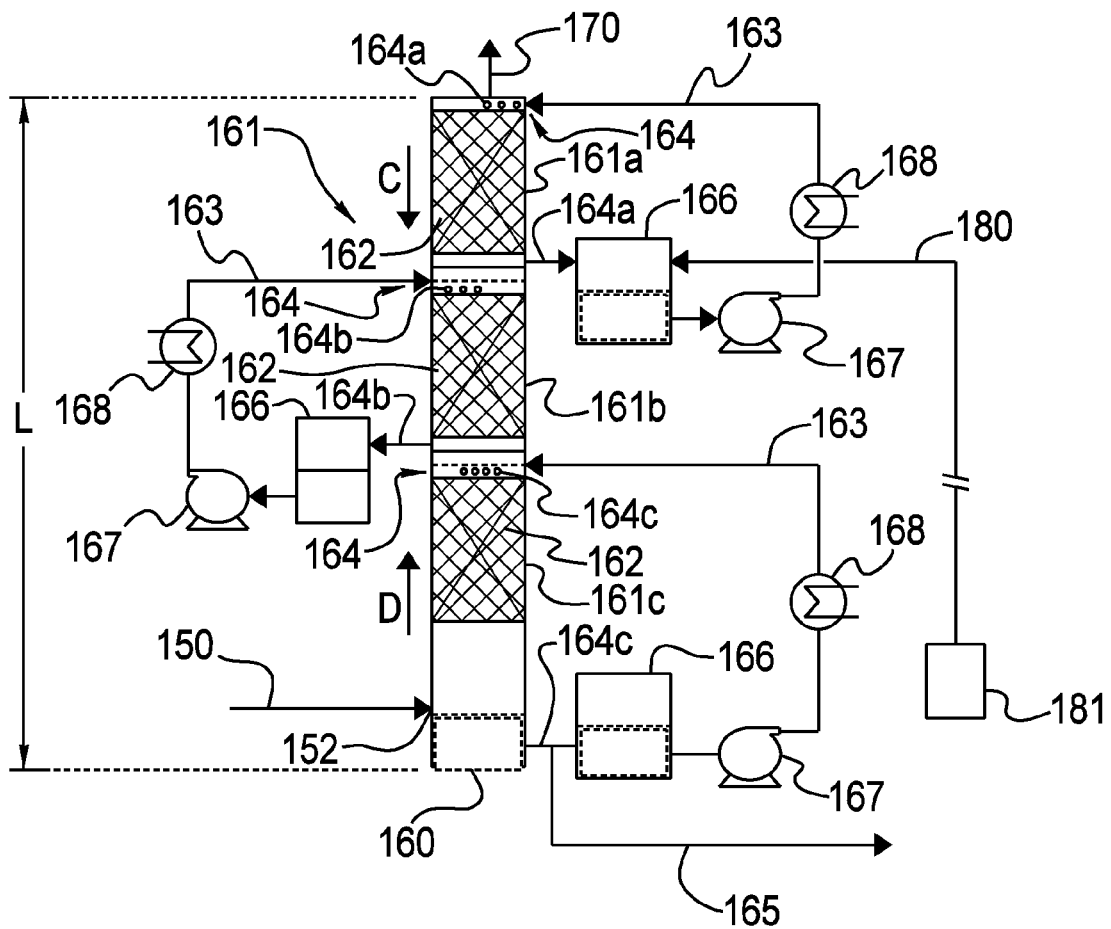
FIG. 3 is an illustration of one embodiment of a wash vessel utilized in the system depicted in FIG. 1.

Wash vessel 160 may have one or more absorption stages, shown generally at 161, to facilitate the absorption of ammonia from the ammonia-containing flue gas stream 150. In one embodiment, as shown in FIG. 3, wash vessel 160 includes three absorption stages, a first absorption stage 161a, a second absorption stage 161b and a third absorption stage 161c. The wash vessel 160 is not limited in this regard as it is contemplated that the wash vessel may have more or less absorption stages than illustrated or described herein. Each of the absorption stages 161, e.g., first, second and third absorption stages 161a, 161b and 161c, may include a mass transfer device 162 and a solution delivery path 163.

The mass transfer device 162 may include packing, such as, for example, random packing, hydrophilic packing, and/or structural packing. Random packing is generally known in the art and refers to packing material introduced to the absorption stage in an un-organized fashion. Examples of random packing include, but are not limited to plastic, metal and/or ceramic packing material in different sizes, e.g., material having varying diameters. Random packing material may also include wood. Hydrophilic packing includes, but is not limited to polypropylene bags.

Structural packing is generally known in the art and refers to packing material that is arranged or organized in a specific fashion. Typically, structural packing is arranged in a manner to force fluids to take a complicated path, thereby creating a large surface area for contact between the liquid and gas. Structural packing includes, but is not limited to structures made of metal, plastic, wood, and the like. It is contemplated that different packing materials facilitate ammonia removal or reduction at different flow rates of a liquid into the wash vessel 160. Additionally, it is contemplated that the different packing materials may provide more suitable pressure drops within the wash vessel 160.

Still referring to FIG. 3, the wash vessel 160 is illustrated as being configured to receive a solution 164 through a solution delivery path 163. In one embodiment, solution 164 removes contaminants from the ammonia-containing flue gas stream 150 present in the wash vessel 160. Specifically, solution 164 may be an ammonia-removing solution for removing ammonia from the ammonia-containing flue gas 150. Removal of ammonia from ammonia-containing flue gas stream 150 results in the formation of an ammonia-containing solution 165 and the reduced-ammonia containing flue gas stream 170.

In one embodiment, the solution 164 is water. In another embodiment, the solution 164 is water containing trace amounts of contaminants, including, but not limited to ammonia and carbon dioxide ($CO_2$).

Solution 164 is provided to the wash vessel 160 through solution delivery path 163. As shown in FIGS. 1 and 3, each of the absorption stages 161 has a solution delivery path 163 for providing the solution to each absorption stage.

In one particular embodiment, as shown in FIG. 3, the solution 164 introduced to the first absorption stage 161*a* includes solution 164*a*, e.g., solution 164*a* is from the bottom of absorption stage 161*a* combined with water 180 provided by a stripping column 181. While not illustrated herein, it is contemplated that solution 164*a* introduced to the first absorption stage 161*a* is not recycled from the bottom of the first absorption stage 161*a*, but rather recycled from the bottom of the wash vessel 160, i.e., recycled from the bottom of the third absorption stage 161*c*. Alternatively, the solution 164*a* introduced to the first absorption stage 161*a* may not be recycled from the wash vessel 160 at all, but rather is water 180 provided by stripping column 181.

The solution 164 provided to the second absorption stage 161*b* includes solution 164*b*, which is water containing low concentration ammonia and $CO_2$ recycled from the bottom absorption stage 161*b*. Solution 164*b* may be, for example, a combination of solution 164*a* that passes through first absorption stage 161*a* and second absorption stage 161*b*, as well as water 180 that passes through the first absorption stage and the second absorption stage, together with solution 164*b* that has already passed through the second absorption stage.

While not illustrated herein, it is contemplated that solution 164*b* introduced to the second absorption stage 161*b* is not recycled from the bottom of the second absorption stage 161*b*, but rather recycled from the bottom of the wash vessel 160, i.e., recycled from the bottom of the third absorption stage 161*c*. Alternatively, the solution 164*b* introduced to the second absorption stage 161*b* may not be recycled from the wash vessel 160 at all, but rather is water 180 provided by stripping column 181.

The solution 164 provided to the third absorption stage 161*c* includes solution 164*c*, which is water containing low concentration ammonia and $CO_2$ recycled from the bottom absorption stage 161*c*. Solution 164*c* may be, for example, a combination of solution 164, solution 164*a* that passes through the first, second and third absorption stages 161*a*, 161*b* and 161*c*, as well as solution 164*b* that passes through the second and third absorption stages, together with water 180 that passes through the first, second and third absorption stages, and solution 164*c* that has already passed through the third absorption stage.

While not illustrated herein, it is contemplated the solution 164*c* introduced to the third absorption stage 161*c* may not be recycled from the wash vessel 160 at all, but rather is water 180 provided by stripping column 181.

As shown in FIGS. 1 and 3, solution 164 recycled from the bottom of absorption stages 161 may pass through a storage tank 166, a pump 167 and a heat exchanger 168, prior to being introduced to the wash vessel 160.

The solution 164 is introduced at the top of each absorption stage 161. As shown in FIG. 3, the solution 164 travels in a direction C down a length L of the wash vessel 160. Direction C is countercurrent to a direction D that the ammonia-containing flue gas stream 150 travels up the length L of the wash vessel 160. As will be appreciated, the solution 164 travels in direction C by virtue of gravity, while the ammonia-containing flue gas stream 150 travels in direction D by virtue of several factors, including pressure drops within the wash vessel 160.

As the solution 164 travels in the direction C, it passes through the mass transfer devices 162 in each of the absorption stages 161. Likewise, as the ammonia-containing flue gas stream 150 travels in direction D, it passes through the mass transfer devices 162 in each of the absorption stages 161.

As the solution 164 travels in direction C down the length L of the wash vessel 160, or a portion thereof, the ammonia concentration in the solution increases, thereby forming the ammonia-containing solution 165 exiting the wash vessel 160. Conversely, as the ammonia-containing flue gas stream 150 travels in a direction D up a length, e.g., the length L, of the wash vessel 160, or a portion thereof, the ammonia concentration in the ammonia-containing flue gas stream decreases thereby forming the reduced ammonia-containing flue gas stream 170 that exits the vessel 160.

In one example, solution 164*a* recycled is introduced at the top of wash vessel 160 over the first absorption stage 161*a* and travels in a direction C down the length L of the wash vessel. The concentration of ammonia present in the solution 164*a* exiting the first absorption stage 161*a* is higher than the ammonia concentration of the solution 164 entering the first absorption stage 161*a* since the solution has contacted the ammonia-containing flue gas stream 150 that travels in direction D up the length L of the wash vessel and absorbed ammonia therefrom. In this embodiment, a greater percentage of ammonia in the ammonia-containing flue gas stream 150 is absorbed by the solution 164 that flows from the first absorption stage 161*a* to the second absorption stage 161*b* since solution 164*a* is "fresh," i.e., it has not reached its maximum ammonia load.

As shown in FIGS. 1 and 3, the solution 164 falls to the bottom of the wash vessel 160 and is removed therefrom as ammonia-containing solution 165. As shown in FIG. 1, the ammonia-containing solution 165 is sent to the stripping column 181, which is configured to receive the ammonia-containing solution through at least one opening, shown as opening 182.

In the stripping column 181, the ammonia, as well as other contaminants, such as $CO_2$, is removed from the ammonia-containing solution 165 to form water 180. It is noted that water 180 may simply be water ($H_2O$), or it may be water having, for example, trace contaminants, such as ammonia.

Ammonia-containing solution 165 may be provided to stripping column 181 through pump 183 to heat exchangers 184. In heat exchangers 184, the ammonia-containing solution 165 is heated via water 180 from the stripping column 181.

Prior to being provided to stripping column 181, a sample of the ammonia-containing solution 165 may be taken. For example, as shown in FIG. 1, a sample of the ammonia-containing solution 165 may be taken at point X to measure the concentration of contaminants, such as ammonia and $CO_2$, present in the ammonia-containing solution 165. Measurement of the concentration of the contaminants may facilitate a user in adapting the process parameters of the system 100 or the stripping column 181.

Still referring to FIG. 1, in one embodiment, stripping column 181 utilizes steam 185 to remove ammonia, as well as other contaminants, from the ammonia-containing solution 165 to form the water 180 that will be introduced to the wash vessel 160. In one embodiment, steam 185 is provided to the stripping column 181 by re-utilizing heat generated in system 100, for example, heat generated by the furnace 122. System 100 is not limited in this regard as it is contemplated that stripping column 181 may utilize other technology or techniques to remove the ammonia and other contaminants from the ammonia-containing solution 165.

By removing ammonia from ammonia-containing solution 165, the solution 164 is regenerated and provided to the wash vessel as water 180.

As shown in FIG. 1, steam 185 enters stripping column 181 at a location in the bottom of the stripping column. The steam 185 travels in a direction E along a length Z of the stripping column 181, or a portion thereof. Simultaneously, the ammonia-containing solution 165 travels in a direction F along at least a portion of the length Z of the stripping column 181, which is countercurrent to the direction E traveled by the steam 185.

As the ammonia-containing solution 165 travels in the direction F along at least a portion of the length Z of the stripping column 181, it contacts mass transfer device 181a located in the stripping column, as well as the steam 185 inside the stripping column that is traveling in the direction E along at least a portion of the length Z of the stripping column Mass transfer device 181a may be packing material, such as random packing material or structural packing material. Stripping column 181 may include one or more mass transfer devices 181a. As shown in FIGS. 1 and 3, stripping column 181 has three mass transfer devices 181a. However, the stripping column 181 is not limited in this regard, as it can include more or less mass transfer devices 181a.

Contact between the steam 185, the packing material of the mass transfer device 181a, and the ammonia-containing solution 165 results in the removal of ammonia 186 from the ammonia-containing solution as well as the formation of a solution free of ammonia, namely water 180, which exits from the stripping column 181.

In one embodiment, ammonia 186 is re-utilized in the system 100. For example, while not shown in FIG. 1, it is contemplated that ammonia 186 is utilized in the absorbing system 130 as ammoniated slurry or solution 140. Re-utilization of ammonia 186 within system 100 prevents or reduces the amount of ammonia that is released from the system to the environment, which in turn reduces or eliminates the need for additional contamination remediation methods. Further, re-utilization of ammonia 186 within system 100 reduces the amount of fresh ammonia, i.e., not recycled ammonia, needed by the system.

In one embodiment, stripping column 181 is operated at a pressure that is less than about 700 kilopascal (700 kpascal), which is equal to about one hundred one pounds per square inch [gauge] (101 psig). In another embodiment, stripping column 181 is operated at a pressure that is less than about 689.475 kilopascal (689.475 kpascal), which is equal to about one hundred pounds per square inch [gauge] (100 psig). In another embodiment, stripping column 181 is operated at a pressure in a range of between about 68.947 kpascal to about 689.475 kpascal, which is equal to a range of between about 10 pounds per square inch [gauge] (10 psig) to about 100 pounds per square inch [gauge] (100 psig). In a further embodiment, the stripping column 181 is operated at a pressure that is less than about 68.947 kpascal, which is equal to about 10 pounds per square inch [gauge] (10 psig).

Operation of the stripping column 181 at low pressure, i.e., a pressure less than about 700 kpascal, facilitates the removal of contaminants from the solution introduced to the stripping column. Specifically, operating the stripping column 181 at a pressure less than about 700 kpascal increases the removal of $CO_2$, which increases the ability of the ammonia to be removed from the ammonia-containing solution.

Additionally, operation of the stripping column 181 at a low pressure, i.e., a pressure less than about 700 kpascal, facilitates the ammonia 186 to be sent directly to the absorbing system 130 to be used as ammoniated solution or slurry 140, rather than subjecting the ammonia 186 to further processing, e.g., providing it to a regenerator. Use of the ammonia 186 within the system 100 may increase overall efficiency and cost effectiveness of the system 100.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for removing ammonia from a $CO_2$-lean stream leaving a $CO_2$ absorbing system; the process comprising:
    contacting a gas stream having $CO_2$ with an ammoniated slurry or solution, thereby forming $CO_2$-lean stream and a $CO_2$-rich stream;
    contacting an ammonia-removing solution with the $CO_2$-lean stream, thereby forming an ammonia-containing solution and a reduced ammonia-containing gas stream;
    providing the ammonia-containing solution to a stripping column; and
    contacting the ammonia-containing solution with steam in the stripping column, thereby removing ammonia from the ammonia-containing solution, thereby forming the ammonia-removing solution and an ammonia-rich gas stream;
    wherein the stripping column is operated at a pressure below 68.947 kilopascal.

2. A process according to claim 1, wherein the ammonia-removing solution comprises water.

3. A process according to claim 1, further comprising:
    providing the ammonia-rich gas stream to the $CO_2$ absorbing system.

4. A process according to claim 1, wherein the absorbing system is operated at a temperature between 0° and 20° Celsius.

5. A process according to claim 1, further comprising generating the steam by combusting a fuel source.

6. A process according to claim 1, wherein the gas stream having $CO_2$ is a flue gas stream.

7. A process according to claim 1, wherein the ammonia-removing solution is substantially water.

8. A process according to claim 1, further comprising providing the $CO_2$-rich rich stream to a regenerator, thereby forming an ammoniated slurry or solution.

9. A process according to claim 8, further comprising providing the ammoniated slurry or solution formed in the regenerator to the absorbing system.

* * * * *